United States Patent [19]

Itria

[11] 4,006,794
[45] Feb. 8, 1977

[54] SEISMIC PNEUMATIC ENERGY SOURCE WITH FLAP VALVES FOR ATTENUATION OF BUBBLE PULSE AMPLITUDE AND REDUCTION OF PERIOD OF BUBBLE OSCILLATION

[75] Inventor: Oswald Alfonso Itria, Bellaire, Tex.
[73] Assignee: Texaco Inc., New York, N.Y.
[22] Filed: Aug. 25, 1975
[21] Appl. No.: 607,307

Related U.S. Application Data

[60] Division of Ser. No. 411,986, Nov. 1, 1973, Pat. No. 3,923,122, which is a continuation of Ser. No. 220,940, Jan. 26, 1972, abandoned.

[52] U.S. Cl. .............................. 181/115; 181/118; 181/120
[51] Int. Cl.$^2$ .......................................... G01V 1/38
[58] Field of Search ............ 181/115, 118, 120, 39

[56] References Cited
UNITED STATES PATENTS

| | | | |
|---|---|---|---|
| 2,877,859 | 3/1959 | Knudsen | 181/115 |
| 3,292,140 | 12/1966 | Angona et al. | 181/115 |
| 3,525,416 | 8/1970 | Mott-Smith | 181/115 |
| 3,601,216 | 8/1971 | Mott-Smith | 181/115 |
| 3,724,590 | 4/1973 | Knudsen | 181/115 |

Primary Examiner—Howard A. Birmiel
Attorney, Agent, or Firm—T. H. Whaley; C. G. Ries; Theron H. Nichols

[57] ABSTRACT

A method for decreasing the amplitude and period of bubble pulses following a primary seismic energy pulse comprises generating an expanding air bubble around a body and preventing the air bubble from contracting into the body for attenuating the sudden contraction and collapse of the air bubble, and two valve devices on a closed cylinder for carrying out the latter method resulting in minimizing bubble effect and the size of the bubble for decreasing amplitude and period of bubble oscillation for providing a clear, well-defined acoustical wave.

14 Claims, 8 Drawing Figures

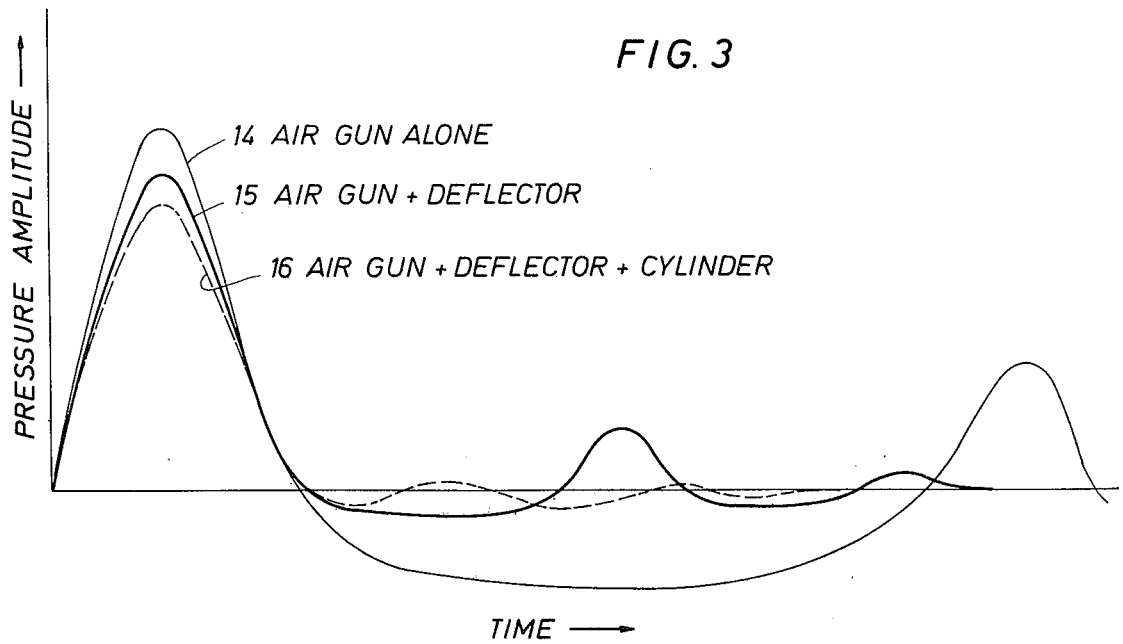
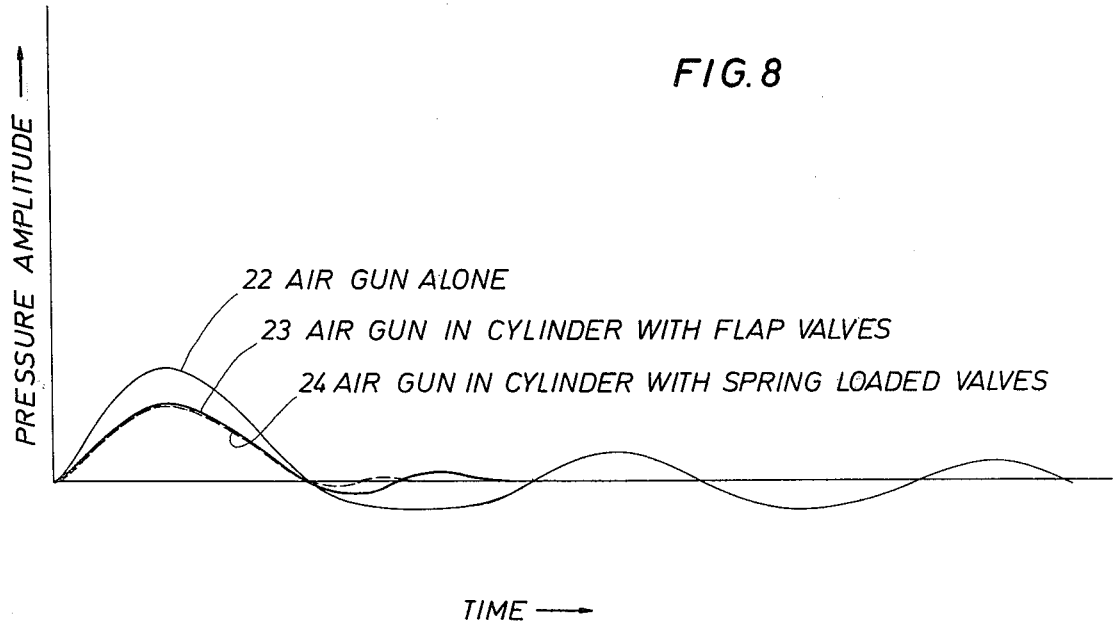

SEISMIC PNEUMATIC ENERGY SOURCE WITH FLAP VALVES FOR ATTENUATION OF BUBBLE PULSE AMPLITUDE AND REDUCTION OF PERIOD OF BUBBLE OSCILLATION

This is a division of application Ser. No. 411,986, filed Nov. 1, 1973, now U.S. Pat. No. 3,923,122 issued Dec. 2, 1975, which is a continuation of application Ser. No. 220,940, filed Jan. 26, 1972, now abandoned.

BACKGROUND OF THE INVENTION

Broadly the present invention relates to seismic exploration and to an improved pneumatic marine seismic energy source for the introduction of seismic energy into water from a floating vessel for supplying compressed air and having a geophysical crew thereon for exploring earth layers and formations underlying bodies of water as oceans, seas, lakes, rivers, or the like. More particularly this invention pertains to two methods and four mechanisms for attenuating the amplitude and reducing the period of bubble pulses or secondary oscillations following a primary seismic pulse.

While the methods and apparatuses of the invention are applicable for many purposes as will be set forth further below, they are illustratively disclosed and described as applied to underwater sound instrumentation such as oceanographic equipment and systems that are employed in seismic exploration of the world's crust under and adjacent to bodies of water.

Since water is such a good sound conductor, it is unnecessary to generate sound waves right on or in the ocean floor; they can be produced in the water near the surface. The pressure waves travel down through the water to the ocean floor and are reflected as in the usual echo-sounding techniques. However, these waves also penetrate into the ocean floor and are reflected from the sub-strata. These acoustical waves also propagate horizontally through one or more geological strata and may be recorded at a distance from the source, thus providing useful refraction data on the stratum or strata involved.

Although explosives for marine seismic work can put large amounts of energy into the water and obtain great depth of penetration, they do have drawbacks; they are dangerous to handle and use, and in some areas such as congested harbors, they cannot be used at all. Also, each "shot" is very expensive and can run into many thousands of dollars per survey. Explosives tend generally to concentrate substantial amounts of their energy output into higher frequency components which may not be desirable for many purposes; whereas, the sound impulse generation method and apparatus for the present invention can be adjusted over a large amplitude range and adjusted in frequency so as to provide the desired spectrum distribution of sound frequencies for the purpose at hand. The methods and apparatuses of the present invention provide flexibility in operation; the sound intensity and characteristics can be adjusted by adjusting the pressures and volumes of compressed air being released.

The present invention is illustratively described as embodied in a device capable of emitting a large amount of acoustical energy into water in the form of a clear, repeatable pulse, the frequency and amplitude of which may be readily averred. These powerful sound impulses are well adapted for use in seismic exploration systems and also can be used to advantage for other purposes.

Seismic surveys which are conducted over water covered areas use various methods for generating seismic energy as by the detonating of conventional powder of dynamite, or gas mixtures, electrical discharge of sparks to ionize a portion of the water surrounding the electrode, or suddenly releasing a container of high pressure air underwater for generating a large seismic or pressure wave signal. These seismic signals are reflected from subsurface geological formations and structures and are received by seismometers and recorded.

In all methods utilized, it is customary to tow one or more detectors through the water in the vicinity of the sound source to detect the signals that are reflected from the various subsurface formations and structures. The detected signals are recorded on suitable equipment contained on the towing vessels, either in the form of analog or digital signals. Also, at times the signals are recorded as variable area signals to provide a profile of the surveyed area. The latter recording is similar to those contained with conventional depth-sounding equipment.

All of the above seismic methods and devices have various disadvantages and thus none is completely suitable for use in all circumstances. The handling of an explosive material is, of course, dangerous as mentioned previously, wherein the explosions themselves tend to kill much marine life, an example being disclosed in U.S. Pat. No. 2,877,859. Also, in the case of dynamite two separate vessels are required; one for handling the dynamite and the other for the recording equipment. This, of course, increases the cost of the survey.

Aside from the operational advantages over conventional dynamite surveys, the disclosed system affords better data acquisition through the effective attenuation of the signals' secondary oscillations.

The use of explosive gas mixture solves some of the problems that arise with dynamite, since explosive gas mixtures do not kill as much marine life, a further example being disclosed in U.S. Pat. No. 3,620,327. Normally, gas mixtures can be stored as separate, non-explosive gases on the same vessel that contains the recording equipment. Thus, the need for an additional vessel or the possibility of killing marine life is reduced. While one disadvantage of gas type sound sources is the relatively short life of the flexible container or sleeve in which the explosive gas mixtures are detonated, conservation of the present environment is one of the principal problems.

In sound sources employing an electrical discharge, it has been customary to discharge a bank of capacitors charged to a high voltage through a single electrode or multiple parallel electrodes and a ground plate. When the capacitor bank is discharged into the water by the electrodes and ground plate the pressure bubble is produced at each electrode tip, for the ground plate serves as a return for the electrical energy. The pressure bubble produces the desired seismic impulse while the ground adds nothing to the magnitude of the outgoing acoustical wave. In fact, only 3–5 percent of the total electrical energy available in the capacitor bank is converted to useful acoustical energy in the water. Further, many spark electrodes in parallel may be used simultaneously as disclosed in U.S. Pat. No. 3,613,823.

Well known methods to attenuate the pulsation of energy bubbles consist in using a metallic sphere which is provided with a plurality of holes regularly distributed on its wall and in which the explosion is carried out, this sphere being made of a material which can withstand the explosion, as disclosed in U.S. Pat. Nos. 2,877,859 and 3,525,416. While, however, it is difficult to build such spheres having a sufficient mechanical strength to withstand numerous repeated explosions, complete attenuation of bubble pulse amplitude is still lacking. Another known device comprises a container with a resilient opening and closing element which provides an intermittent connection of the interior of the container with the surrounding liquid medium, as disclosed in U.S. Pat. No. 3,444,953. None of the above systems completely attenuate the amplitude of bubble pulsation or oscillations.

OBJECTS OF THE INVENTION

Accordingly, a primary object of this invention is to provide at least two methods for attenuating the amplitude and reducing the period of bubble pulses resulting from a generated primary seismic energy pulse.

Another primary object of this invention is to provide several mechanisms for carrying out the methods for attenuating amplitude and reducing the period of bubble pulses resulting from a generated principal seismic energy pulse.

A further object of this invention is to provide a mechanism for shaping the desired seismic signal by elongating the shape of the bubble.

Another object of this invention is to attenuate the associated seismic bubble pulse and its detrimental effect to seismic exploration.

A still further object of this invention is to provide a seismic energy source with deflectors for shaping the primary pulse so that its dominate frequency will be lowered for placing more of the energy into the useful seismic frequency range which results in greater penetration of the seismic signal within the sedimentary section.

Another object of this invention is to provide a seismic energy source which is easy to operate, is of simple configuration, is economical to build and assemble, and is of greater efficiency for generating a primary pulse for greater penetration of the seismic signal within the sedimentary section.

Other objects and various advantages of the disclosed seismic energy source with pulse shaping for offshore subsurface exploration will be apparent from the following detailed description, together with accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, four forms or mechanisms for carrying out two methods of the invention wherein like reference numerals have been employed to indicate similar parts in the several views in which:

FIG. 3 is a pressure amplitude versus time set of typical curves for the embodiments of FIGS. 1 and 2;

FIG. 8 is a pressure amplitude versus time set of typical curves for the embodiments of FIGS. 4 and 6.

DESCRIPTION OF THE PREFERRED EMBODIMENT

Figure 1:
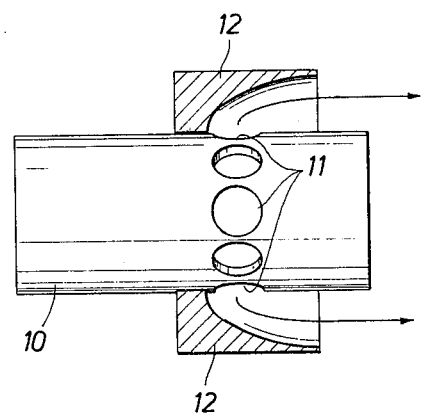
FIG. 1 is a schematic sectional view of one embodiment of the new seismic energy source for attenuating amplitude and time duration of bubble pulses.

The invention disclosed herein, the scope of which being defined in the appended claims, is not limited in its application to the details of construction and arrangement of parts shown and described for carrying out the methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

The shape of the primary seismic pulse generated by the discharge of an explosive device, such as but not limited to, an air gun under water is determined primarily by the size of the air gun's port and throat areas, the rate of discharge of the air or gas into the surrounding water, the gas pressure and the reservoir chamber, and the volume of air discharged into the water. If a particular design of air gun is operated at the same air pressure and chamber volume of gas, it can be predicted that the generated primary pulse shape will be repeatable. Changing the charging pressure of the air chamber, other than altering the amplitude of the primary pulse will not have any significant effect on the time duration of the primary pulse.

This invention comprises two methods for attenuating the amplitude and reducing the period of bubble pulses resulting from a primary seismic energy pulse.

One method for attenuating the amplitude and reducing the period of bubble pulses following a primary seismic energy pulse comprises deflecting all of the expanding gases into the same direction to form the bubble into an elongated shape. The second method comprises generating an expanding air bubble around a body and then preventing the air bubble from contracting into the body for attenuating the sudden contraction and collapse of the air bubble, resulting in decreased amplitude and period of bubble pulses.

It has been discovered that if a spherically shaped bubble is flattened or elongated so that the diameter or length of the major axis of the bubble is many times greater than the dimension of the bubble on the minor axis, the bubble will collapse with reduced force or impact and, as a result, the amplitude of the generated bubble pulse will be appreciably reduced. This is because the period of bubble oscillation and bubble amplitudes are essentially in direct relationship to the smaller dimension of the bubble since the hydrostatic pressure on all surfaces of the bubble is, for all practical purposes, the same.

forth hereinbefore by reducing or minimizing magnitude or peak pressures of bubble pulses and oscillations.

While only two methods of the invention and four mechanisms for carrying out the methods have been disclosed, it will be evident that various other methods and modifications are possible in the arrangement and construction of the disclosed seismic energy source with attenuation of bubble pulse amplitude and the reduction of the period of bubble oscillation without departing from the scope of the invention and it is accordingly desired to comprehend within the purview of this invention such modifications as may be considered to fall within the scope of the appended claims.

I claim:

1. A method for attenuating the amplitude and reducing the period of bubble pulses resulting from a primary seismic energy pulse generated by a rapid expansion of gases underwater from an air gun having a single row of perforations therearound mounted inside of a body having a multiplicity of rows of perforations therein comprises the steps of,
   a. aligning the air gun single row of perforations between two of the rows of perforations in the body,
   b. generating with the air gun an expanding gas bubble around the body, and
   c. preventing any portion of the generated gas bubble from contracting into the body for attenuating the sudden contraction and collapse of the gas bubble.

2. A method as recited in Claim 1 wherein the second step further comprises,
   a. generating the primary pulse and accompanying expanding gas bubble internally of the perforated body with the air gun mounted in the body with its single row of perforations radiating gases against the body between two rows of the perforations in the body prior to the gases expanding through the body perforations, and
   b. permitting the gas to expand outwardly through the perforations of the body to form the bubble at least as large as the body with the body internally thereof.

3. A method as recited in claim 1 wherein the third step comprises,
   a. preventing any portion of the generated gas bubble from contracting back through any of the perforations of the perforated body by closing the multiplicity of perforations therein by closing a valve in each one of the multiplicity of body perforations for minimizing bubble effect and the size of the bubble for thereby attenuating the sudden contraction and collapse of the gas bubble.

4. A seismic energy source means for offshore subsurface exploration comprising,
   a. an energy source having a single row of exhaust ports therearound for a rapid exit of gases for generating a primary seismic energy pulse and the attendant bubble pulses,
   b. perforated body means surrounding said energy source and having a multiplicity of rows of perforations therein,
   c. said single row of energy source exhaust ports being positioned radially between two rows of said body perforations whereby said exhaust ports radiate gases against said body prior to the gases expanding rhrough said body perforations for minimizing bubble effect and the size of the bubble,
   d. valve means for passing said gases out of said perforated body for the forming of a gas bubble therearound when generating the primary seismic pulse, and
   e. said valve means also preventing any portion of said gas bubble from flowing back into said perforated body for attenuating the sudden contraction and collapse of said gas bubble for attenuating the amplitude and reducing the period of said bubble pulses.

5. A seismic energy source means as recited in claim 4 wherein,
   a. said single energy source is an air gun having said single row of exhaust ports for the rapid exit of expanding air for generating the primary seismic energy pulse.

6. A seismic energy source means as recited in claim 4 wherein,
   a. said valve means comprises an individual flapper valve mounted over each perforation in said body whereby gas pressure from said rapid exit of gases opens said flapper valves and hydrostatic pressure of the surrounding water closes all of said flapper valves for preventing any portion of said gas bubble from flowing back into said perforated body.

7. A seismic energy source means as recited in claim 4 wherein,
   a. said valve means comprises an individual spring biased valve over each of said perforations in the body so that gas pressure from said rapid exit of gases opens each of said spring valves and preset spring valves and preset spring pressure closes each of the valves for preventing any portion of said gas bubble from flowing back into said perforated body.

8. A seismic energy source means as recited in claim 7 wherein,
   a. the spring pressure of said individual spring biased valves may be set to a faster closing rate resulting in a clear, well-defined primary acoustical pulse.

9. A seismic energy source means for offshore subsurface exploration comprising,
   a. an air gun having an exhaust port for the rapid exit of expanding air for generating the primary seismic energy pulse,
   b. a cylinder mounted around said air gun to at least enclose that portion of the air gun with the exhaust port, said cylinder having a plurality of rows of openings therearound,
   c. individual valves mounted over each of said openings for passing the expanding air for forming an air bubble around the cylinder when generating said primary seismic energy pulse and the attendant bubble pulses, and
   d. said plurality of rows of individual valves preventing any portion of said air bubble from passing back into said cylinder for attenuating the sudden contraction and collapse of said air bubble for attenuating the amplitude and reducing the period of said bubble pulses.

10. A seismic energy source means as recited in claim 9 wherein,
    a. said valves comprise individual flapper valves over each of said cylinder openings so that air pressure from said rapid exit of air opens said individual flapper valves and hydrostatic pressure of the surrounding water closes said valves for preventing FIGS. 1, 2, and 3 illustrate two embodiments of the invention and a pressure amplitude versus time diagram for carrying out the first method for decreasing the amplitude and the period of the secondary oscillations, following a primary seismic energy pulse.

FIG. 1 illustrates a conventional air gun 10 having exit or exhaust air ports 11 for exhausting the expanding high pressure air when generating a primary seismic energy pulse. Mounted around these exit ports is deflector 12 for deflecting the air from all of the ports 11 into one direction, as to the right as shown in FIG. 1. Upon the firing of this air gun 10 an air bubble is formed. However, with all the air being blown in one direction the air bubble becomes elongated in shape. Because the period of the bubble oscillation is dependent upon the smaller dimension of the air bubble, the resultant bubble pulse period of an elongated bubble is accordingly diminshed or shortened extensively.

Figure 2:
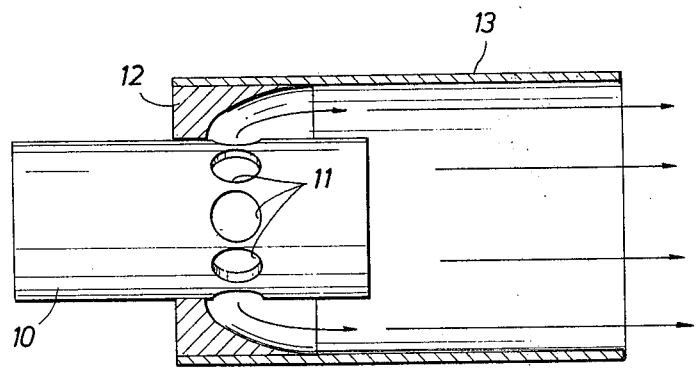
FIG. 2 is a modification of the embodiment of FIG. 1.

FIG. 2 illustrates a modification of FIG. 1 wherein the conventional air gun 10 is illustrated with exit ports 11 and the new deflector 12 is mounted over each of the ports for deflecting the exhausting expanding air in one direction, as to the right as illustrated in FIG. 2. Connected to the deflectors as by any suitable connection, as by welding is a cylinder 13 for straightening and holding the exhausting air in one direction resulting in a very elongated bubble. This bubble being elongated to a greater extent thus attenuates the amplitude of the signal to a greater extent and particularly the resulting bubble pulses generated from the primary energy pulse are attenuated. The flatter the bubble, the more the bubble pulses are attenuated. Likewise the bubble pulse period is accordingly shortened.

FIG. 3 shows the results of first the primary pulse 14 generated by the air gun alone and its attendant bubble pulses, as illustrated by the thin line 14, wherein the ordinate in the Cartesian coordinate system represents the pressure amplitude in psi (pounds per square inch) and the abscissa represents the time in milliseconds.

The thick line 15, FIG. 3, illustrates the result of the air gun 10 with the deflector 12 of FIG. 1 added thereto showing the slightly attenuated primary energy pulse with the attenuated two bubble pulses.

The dotted line 16, FIG. 3, illustrates the air gun 10 with the deflector 12 and the cylinder 13 attached thereto as illustrated in FIG. 2. Here in FIG. 3, while the primary pulse is attenuated slightly, the detrimental bubble pulse amplitudes resulting therefrom are attenuated to a greater extent and the period is decreased as illustrated by the two bubble pulses, FIG. 3.

FIGS. 4–8 illustrate two embodiments and a pressure amplitude versus time diagram for carrying out the second method for decreasing the amplitude and period of the secondary bubble pulses following a primary seismic energy pulse.

Figure 4:
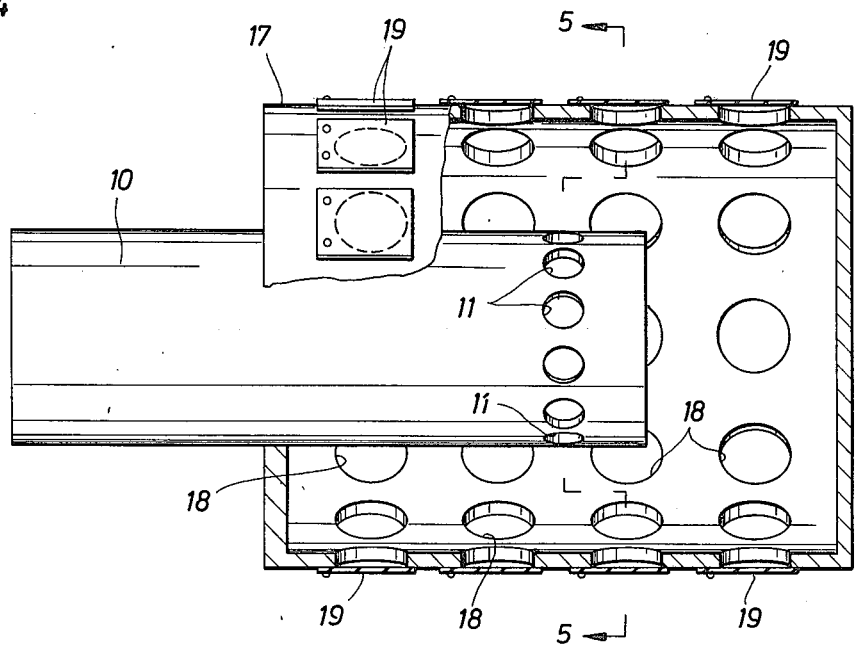
FIG. 4 is a schematic perspective view of a third embodiment with a flapper type of valve.

FIG. 4 illustrates a mechanism for carrying out the second method of the invention for limiting collapse of the initial air bubble. Here a conventional air gun 10 with exhaust ports 11 is illustrated mounted inside of a body such as a cylinder 17. The cylinder here shown has four rows of openings 18 completely around the cylinder. The air gun 10 is mounted in the cylinder 17 such that its exhaust ports 11 are not in line with any of the openings 18 in the cylinder. Each of the openings in the cylinder is covered with a flap valve 19. FIG. 4 illustrates flap valves 19 as being used over at least a majority of the holes in the cylinder, if not all of the holes.

Thus in operation, after the gun has fired for generating the first primary impulse, the expanding air exhausts from the gun ports 11, filles the cylinder 17, and then passes out through the openings 18 externally of the cylinder. After the air bubble reaches its maximum size, it begins to collapse and contract and the air starts to flow back inside of the cylinder. This return flow of air snaps shut the flap valves and prevents the bubble from collapsing suddenly to thereby attenuate the amplitude and reduce the period of the bubble pulses as illustrated by the operating curves of FIG. 8.

Figure 5:
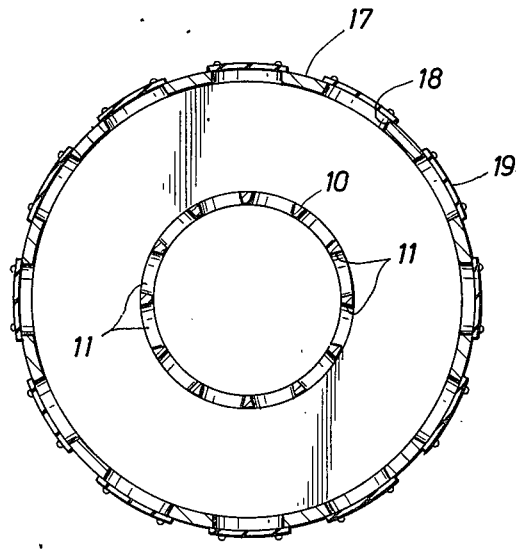
FIG. 5 is a section at 5—5 on FIG. 4.

FIG. 5, a sectional view at 5—5 on FIG. 4, illustrates how the air gun exhaust ports 11 are not in alignment with the cylinder openings 18.

In operation of the flap valve 19, FIG. 4, in 30 feet of water, for example, the differential hydrostatic pressure for closing the valve is approximately 15 psi (pounds per square inch).

Figure 6:
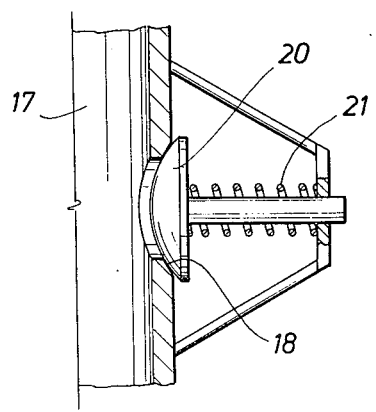
FIG. 6 is a detailed schematic, sectional view of a modified valve for the embodiment of FIG. 4, illustrating the valve in closed position.
Figure 7:
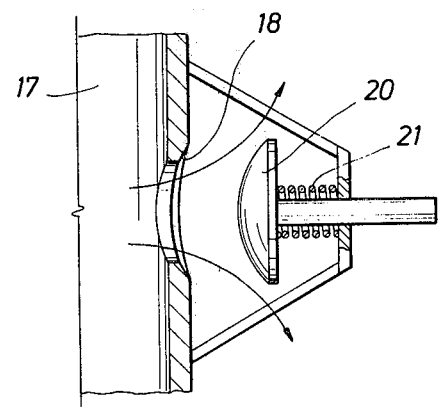
FIG. 7 is a view like FIG. 6, but with the valve in open position during rapid expansion of the gas.

FIGS. 6 and 7 illustrate a modified but more effective spring valve 20 for each of the openings 18 of the cylinder 17, FIGS. 4–7. FIG. 6, an exploded view of one of the openings 18 illustrates the valve 20 being spring loaded to close position over an opening 18 in the wall of the cylinder 17.

FIG. 7 illustrates the spring 21 of the valve 20 being compressed as the internal pressure of the cylinder exceeds the spring pressure or force and the expanding air rushes out through the openings 18 externally of the cylinder. FIG. 7 illustrates the air rushing out of the cylinder to form a bubble therearound. A feature of this valve is that immediately upon the air pressure becoming neutralized or slowing down just prior to its reaching its maximum size and tending to rush back inside the cylinder, the springs close these valves to prevent total bubble collapse, thereby forming a more efficient and instantaneous, quick-acting valve for attenuating the sudden collapse and contraction of the air bubble.

Accordingly, in operation of the spring loaded valve 20 of FIGS. 6 and 7, the spring pressure may be set to operate at 200 psi, for example, and accordingly results in a valve having a much faster closing rate with more positive action. The result is a clear, well-defined primary acoustical pulse.

FIG. 8 illustrates the result of three typical signals on a pressure amplitude versus time chart similar to the coordinates of FIG. 3. The solid thin line curve 22 illustrates the results of the firing of the air gun alone and the attendant bubble pulses following the primary seismic energy pulse. The heavy line curve 23 illustrates the result of the air gun firing when enclosed in cylinder 17 with flap valves 19 of FIGS. 4 and 5 showing how the primary pulse is attenuated slightly but the secondary pulses are attenuated to a much greater extent, and the bubble period is decreased as illustrated in FIG. 8. The third dotted line curve 24, FIG. 8, illustrates the results of the air gun fired within the cylinder with each of the holes in the cylinder covered with the spring loaded valve 20 illustrated in FIGS. 6 and 7. Here the amplitude attenuation of the secondary pulses is even greater with further reduction in the period of the bubble oscillations. In this chart likewise, th pressure amplitude is measured in psi and the time is measured in milliseconds.

Accordingly, it will be seen that the disclosed seismic pneumatic energy sources with attenuation of bubble pulse amplitude and reduction of bubble period operates in a manner which meets each of the objects set any portion of said air bubble from flowing back into said perforated cylinder.

11. A seismic energy source means as recited in claim 9 wherein,
 a. said valves comprise rows of spring operated valves over each of said cylinder openings whereby air pressure from said rapid exit of air opens said spring operated valves and preset spring pressure of the spring operated valves closes each of the valves for preventing any portion of said air bubble from flowing back into said perforated cylinder.

12. A seismic energy source means as recited in claim 11 wherein,
 a. the spring pressure of said spring operated valves may be set to a different closing rate resulting in a clear, well-defined primary acoustical pulse.

13. A method attenuating the amplitude and reducing the period of bubble oscillation resulting from a primary seismic energy pulse generated by a rapid expansion of gases comprising the steps of,
 a. generating an expanding gas bubble,
 b. passing said gas bubble through a hollow perforated body having a plurality of rows of perforations with an individual valve over each perforation, and
 c. preventing the passing of any portion of said gas bubble back internally of said perforated body by closing of the individual valves resulting in attenuation of amplitude and reduction of the period of the bubble oscillation.

14. A seismic energy source means for offshore subsurface exploration comprising,
 a. energy source means having a single row of perforations therearound mounted inside of a body having a multiplicity of rows of exhaust ports therein for generating a primary seismic energy pulse from a rapid expansion of gases therefrom said single row of perforations out through said plurality of exhaust ports, and
 b. valve means for each exhaust port being responsive to said energy source means for minimizing bubble effect and the size of the bubble for attenuating amplitude and reducing the period of bubble pulses following said primary seismic energy pulses.

* * * * *